(12) United States Patent
Tadler et al.

(10) Patent No.: US 6,787,073 B1
(45) Date of Patent: Sep. 7, 2004

(54) WASTE POLYMER PROCESSING DEVICE AND METHOD

(75) Inventors: Kenneth J. Tadler, Wilmington, DE (US); Robert J. Welch, Salisbury, MD (US)

(73) Assignee: Invista North America S.a.r.l., Wilmington, DE (US)

( * ) Notice: Subject to any disclaimer, the term of this patent is extended or adjusted under 35 U.S.C. 154(b) by 301 days.

(21) Appl. No.: 10/048,351

(22) PCT Filed: Aug. 3, 2000

(86) PCT No.: PCT/US00/21158

§ 371 (c)(1), (2), (4) Date: Jan. 28, 2002

(87) PCT Pub. No.: WO01/10620

PCT Pub. Date: Feb. 15, 2001

Related U.S. Application Data

(60) Provisional application No. 60/147,455, filed on Aug. 5, 1999, and provisional application No. 60/149,043, filed on Aug. 16, 1999.

(51) Int. Cl.[7] .............................. B29B 9/10; B29B 9/06
(52) U.S. Cl. .............................. 264/5; 264/13; 264/14; 425/183; 425/301
(58) Field of Search ................................ 425/183, 301; 264/5, 13, 14

(56) References Cited

U.S. PATENT DOCUMENTS

| | | | |
|---|---|---|---|
| 2,858,251 A | 10/1958 | Pachter et al. | |
| 3,589,163 A | * 6/1971 | Byrne et al. | 72/270 |
| 4,321,026 A | 3/1982 | Lambertus | |
| 4,984,977 A | * 1/1991 | Grimminger et al. | 425/145 |
| 5,496,508 A | 3/1996 | Hettinga et al. | |
| 5,641,522 A | 6/1997 | Satanovsky | |
| 5,665,402 A | 9/1997 | Czarnetzki et al. | |
| 5,723,082 A | 3/1998 | Mizuguchi et al. | |
| 5,728,741 A | * 3/1998 | Zegler et al. | 521/40 |
| 5,914,353 A | * 6/1999 | Grizzle et al. | 521/40 |

FOREIGN PATENT DOCUMENTS

| | | |
|---|---|---|
| EP | 0 630 572 B1 | 6/1993 |
| EP | 0 774 332 A2 | 11/1996 |
| GB | 1382701 | 4/1971 |
| JP | 07227844 A | 2/1994 |
| JP | 81-55957 | 12/1994 |

* cited by examiner

*Primary Examiner*—Stephen J. Lechert, Jr.
(74) *Attorney, Agent, or Firm*—George M. Medwick

(57) ABSTRACT

A method and apparatus to process a diverted molten polymer waste stream directs the polymer stream to one of at least two passages, separates it into individual segments while containing and discharging it from a containment exit, cools each segment with a quench fluid to form a solid or semi-solid polymer, and transports the solidified segments away from the exit and into a container using the quench fluid. The apparatus includes a cross-section transition connector, a moveable block with two passages, a block oscillator, a cut-off plate, and open space above an inclined transporting device, a quench fluid jet, and a quench fluid transporting trough.

15 Claims, 9 Drawing Sheets

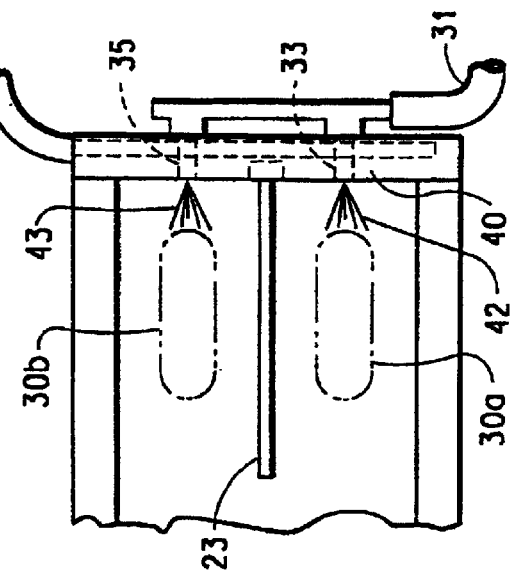
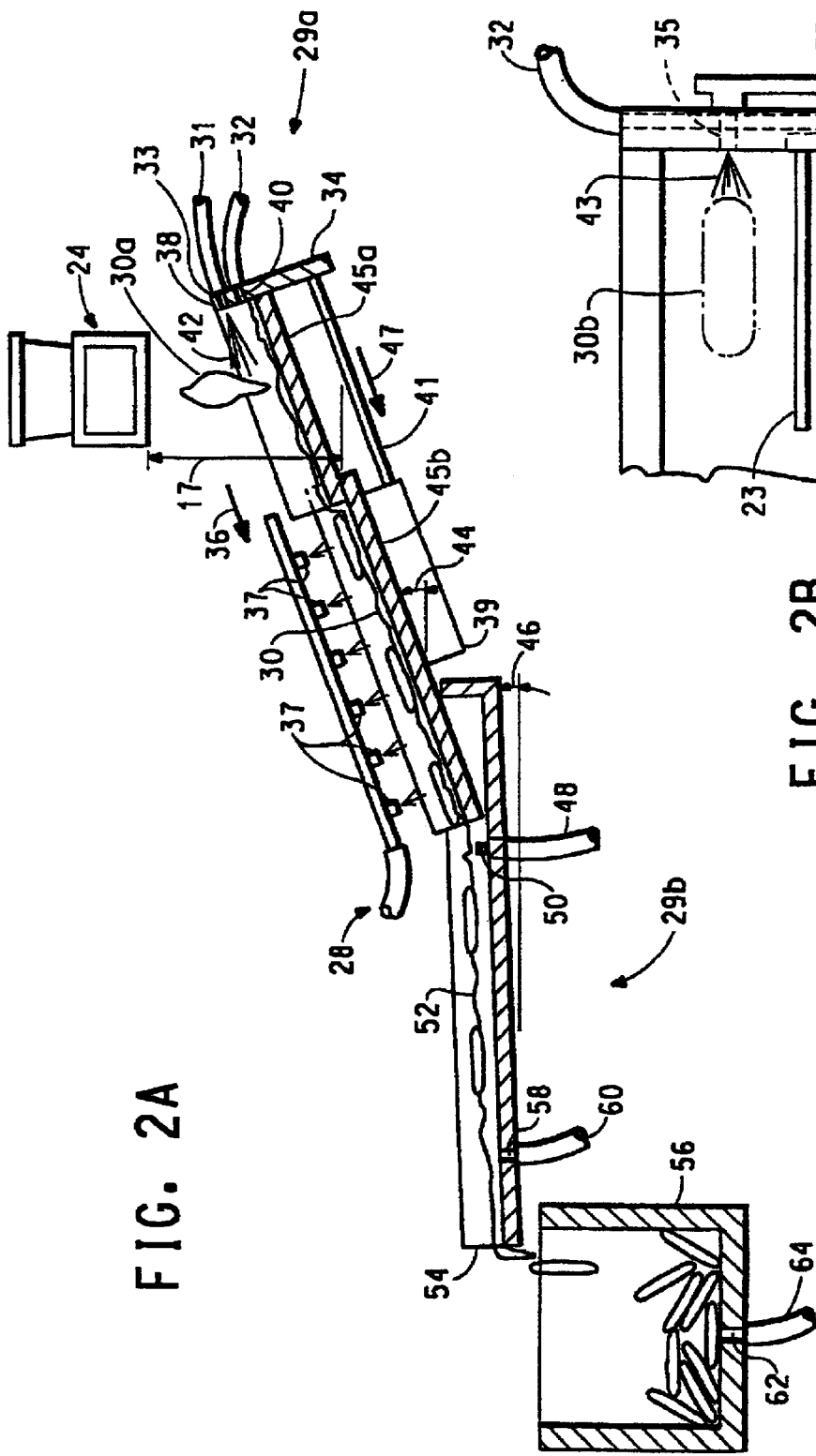
FIG. 2A
FIG. 2B

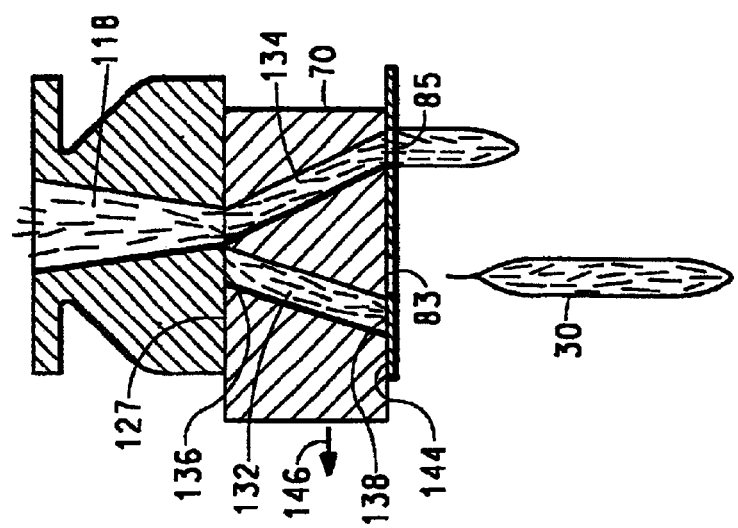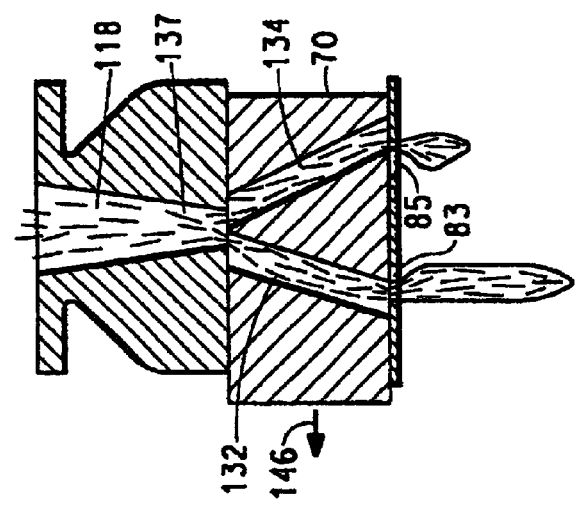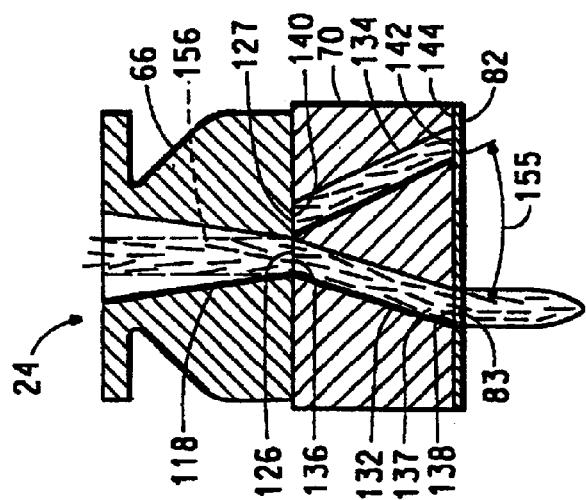

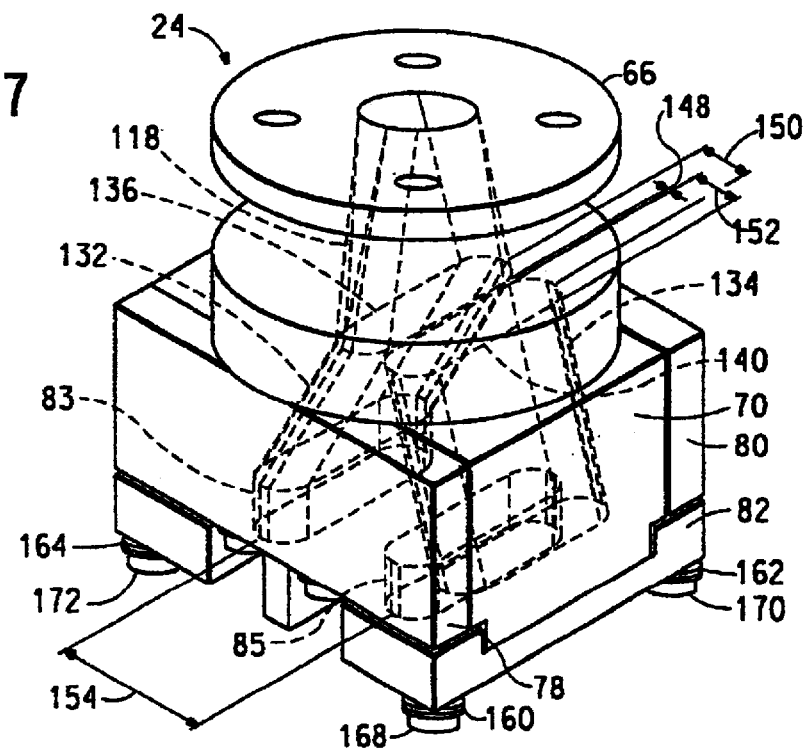
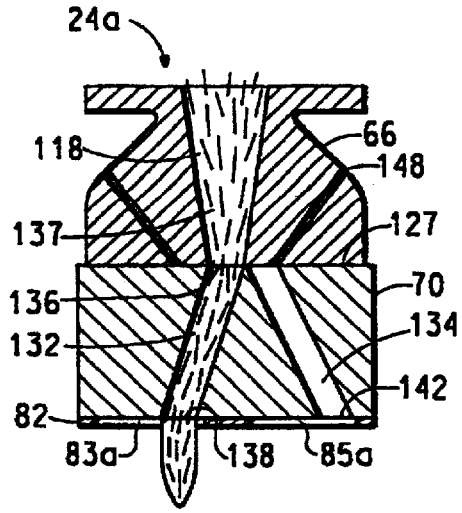
FIG. 7
FIG. 8
FIG. 9

WASTE POLYMER PROCESSING DEVICE AND METHOD

This application is a 371 of PCT/US00/21158, filed Aug. 3, 2000. This application claims benefit under 35 U.S.C. 119(e) of Provisional Application 60/147,455, filed Aug. 5, 1999 and Provisional Application 60/149,043, filed Aug. 16, 1999

BACKGROUND OF THE INVENTION

1. Field of the Invention

This invention relates to the field of polymer treatment apparatuses and methods for processing polymer waste wherein the waste is processed in a form suitable for recycling.

2. Description of the Prior Art

According to known procedures continuous polymerization lines are operated to produce polymer products. One such product is pellets of polymer for further use, such as remelting to produce melt-spun thermoplastic filaments, for example, of nylon or polyester. During routine maintenance of such pelletizing equipment or during system failures the stream of molten polymer from the continuous polymerization line cannot be stopped and must be diverted to waste Normal procedure for machines with a capacity of only one thousand to three thousand pounds per hour is to extrude the polymer directly onto the floor next to the pelletizer or into a buggy during the limited time the pelletizer is not operational. The waste, or "plop", collected in this manner is manually handled to prepare it for recycle as a second quality polymer.

An alternative to placing plop on the floor or into a buggy is disclosed in U.S. Pat. No. 5,496,508 (Hettinga et al). In this patent the purged polymer is directed into a hopper and between two rollers, which cool and compress the purge to a continuous strip thickness suitable for subsequent processing. The strip is collected in a hollow steel container. The strip may be corrugated on one side or split into a plurality of strips. Other alternatives are disclosed by Japanese Patents JO 72 27874 and JO 81 55957 where in both separate cases the waste polymer is separated into discrete volumes and placed into individual containers that are part of a conveying system. In the former patent the polymer stream is never interrupted and is only temporarily diverted as the containers are switched. In the latter patent the polymer is collected between a fixed plate and a moveable plate that opens and closes periodically to discharge a discrete volume of polymer and cut it into a block that falls into a conveyed bucket containing a quench fluid. There is no indication that these alternatives can handle more than one thousand to three thousand pounds per hour of molten polymer.

When the capacity of the continuous polymerization pelletizing line is greater than three thousand pounds (1360 Kg) per hour (up to twelve thousand pounds (5440 Kg) per hour) it becomes unwieldy, labor intensive, and dangerous to handle the large volume of hot polymer which approaches two hundred pounds(1.5 Kg) per minute or 3.3 pounds per second. Such large quantities of molten polymer collected in one mass also present a significant fire hazard in the area. For nylon polymer with a specific gravity of 1.2, this is about 2.7 cubic feet (0.08 cubic meters) per minute of polymer at about three hundred (300° C.) degrees Centigrade. If this quantity of nylon polymer is exiting out of a three-inch (7.62 cm) diameter pipe, the velocity of polymer to be handled approaches eleven inches (27.9 cm) per second. There is a need for a system to safely and economically handle large flow rates of molten polymer waste in a way that makes it easy to recycle.

SUMMARY OF THE INVENTION

The invention is a method and apparatus to process a diverted molten polymer waste stream by directing the polymer stream to one of at least two passages, separating the molten polymer into individual pieces or segments while containing the polymer and discharging the polymer from a containment exit, cooling each segment with a quench fluid to form a solid or semi-solid polymer, and transporting the solidified segments away from the containment exit and into a container using the quench fluid. One preferred apparatus comprises a cross-section transition connector, a moveable block with two passages, a block oscillator, a cut-off plate, an open space above an inclined transporting device, a quench fluid jet, and a quench fluid transporting trough. The transporting trough is designed to provide adequate time and cooling for solidification of polymer segments and to transport the segments to a desired location laterally spaced from the containment exit. The cross-section transition connector changes the polymer cross-section from cylindrical to a flattened cylinder, which reduces the distance required to traverse and cut the polymer stream. Directing the polymer stream to one or the other or both of at least two passages provides a continuous path for the polymer stream so pressure does not build up in the polymer that may damage elements in the system, and so gravity draining is provided when the system shuts down. Other apparatuses show other means of accomplishing the directing of polymer using a conically shaped bloc that is rotatably moved. Movement of the block in some apparatuses may occur in either reciprocating rectilinear directions or in a rotational direction.

BRIEF DESCRIPTION OF THE DRAWINGS

The invention will be more fully understood from the following detailed description thereof, taken in connection with the accompanying drawings, which form a part of this application and in which:

FIG. 2A is a side section view of a transporting device for quenching and moving polymer segments away from the segmenting device, and FIG. 2B is a plan view of the upper end of the transporting device;

FIGS. 6A, 6B, and 6C are section views through the polymer segmenting device of FIG. 3 showing the sequence of positions of a moveable block in the operation of the device;

FIG. 7 is a perspective view of a portion of a segmenting device showing the passages and cut-off openings in hidden view;

FIG. 8 is an alternate embodiment of the segmenting device where the cut-off occurs between the moveable block and the transition connector;

FIG. 9 is an end view of the segmenting device of FIG. 7;

DETAILED DESCRIPTION OF THE INVENTION

Figure 1:
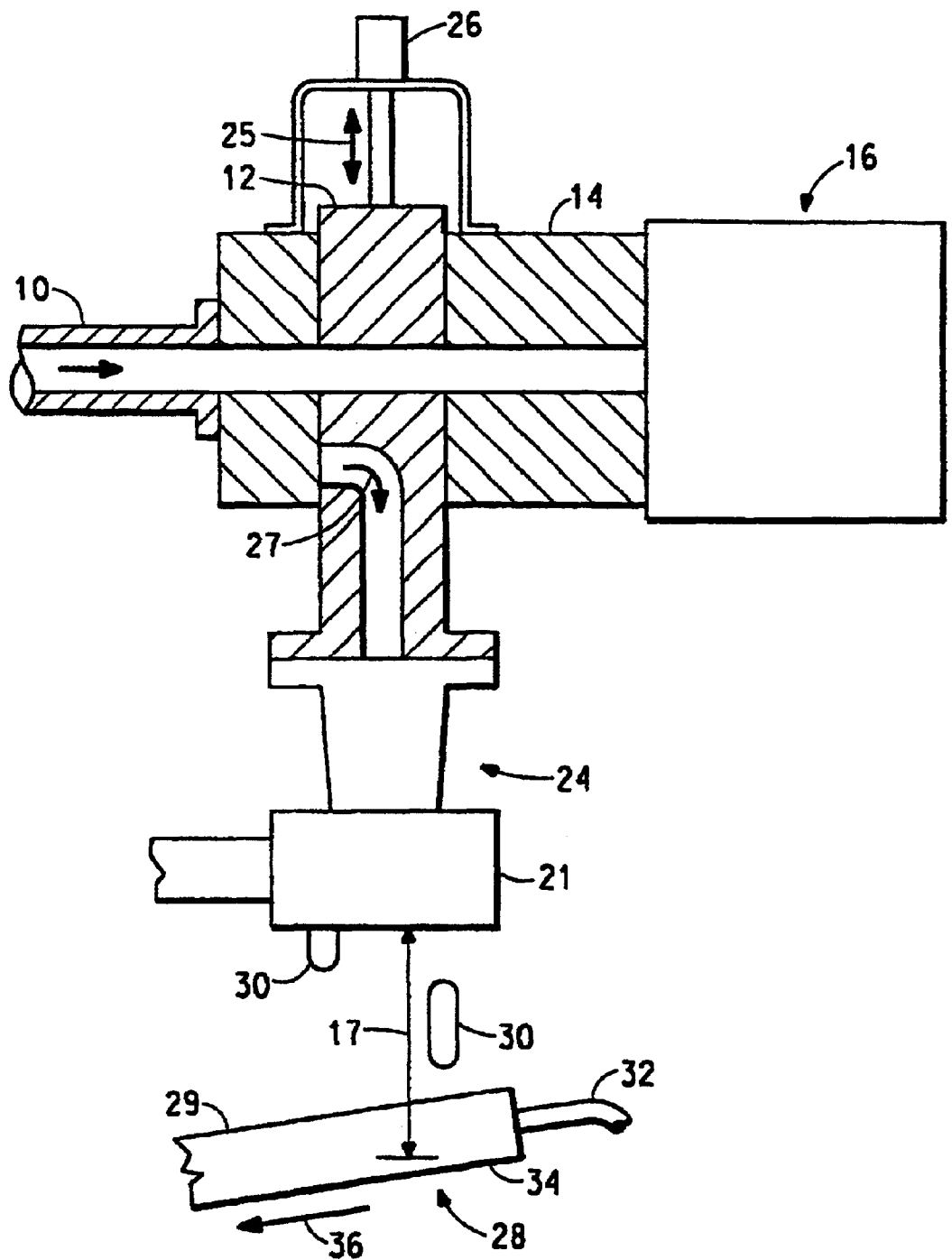
FIG. 1 is a side section view of a polymer extrusion line with a diverter valve and polymer segmenting device.

Throughout the following detailed description similar reference numerals refer to similar elements in all figures of the drawings.

FIG. 1 shows a polymer extrusion line for making polymer pellets. Molten polymer enters through conduit 10 and in normal operation passes through a diverter valve 12, a polymer stream conduit 14, and a pellet forming device 16. The diverter valve is shifted during an unscheduled outage or scheduled maintenance to divert the flow of polymer to a segmenting device 24. The valve 12 is shifted from the forward position shown to a back position by an actuator 26 that moves the valve 12 and the segmenting device 24 attached thereto back and forth in the direction of double ended arrow 25. In the back position the polymer flows in the direction of arrow 27 to the segmenting device. The segmenting device contains the polymer until it passes through a containment exit at position 21. With the exception of the segmenting device 24, the extrusion line with diverter valve just described is of conventional design known in the art.

Beneath the containment exit of the segmenting device is an open space 17 above a transporting device 28. The transporting device 28 includes an inclined trough 29 which is open on the top to receive falling segments of molten polymer, such as segments 30 from two polymer exit openings in the segmenting device 24. The open space is sufficient so the polymer passing through the containment exit can be formed into a discrete segment of polymer, preferably before the polymer contacts the transporting device. A fluid conduit 32 attached to the transporting device 28 supplies fluid to the trough at the upper end 34 to lubricate the surface of the trough and to quench and transport the segments 30 along the transporting device 28 away from the segmenting device 24 in the lateral direction indicated by the arrow 36.

FIGS. 2A and 2B show additional details of the transporting device 28. In one embodiment the inclined trough 29 includes a first trough 29a that has an end wall 38 with a slot opening 40 in fluid communication with the conduit 32. The segmenting device in FIGS. 2A and 2B is rotated ninety degrees from the view in FIG. 1 so the segments are arranged one beside the other in the trough as seen looking at phantom segments 30a and 30b in FIG. 2B. A separator panel 23, in the center of the trough, keeps the segments from contacting one another in the portion of the trough where the segments first contact the trough. The panel also keeps each segment in a confined space to limit folding and spreading of the segment when it hits the trough. Fluid, such as water, exiting the opening 40 covers the bottom of the trough with water which acts to lubricate the bottom surface. Another conduit 31 is in fluid communication with a plurality of fluid jet openings, such as jets 33 and 35, that form forceful streams 42 and 43 that are directed against a segment, such as segment 30a, to accelerate the segment down the trough 29a in the direction of arrow 36. It is important that a first segment is accelerated to move quickly along the trough so that a second segment following the first will not contact the first when the second contacts the trough. If the two segments contact each other while still molten they may become permanently joined which is undesirable. The segments may fold on themselves and twist and flop over to their flat side when contacting the trough and get quenched in an irregular shape. The quenched shape of the segments is not so important as long as the segments can be transported along the trough and remain separate individual polymer segments that do not join other segments while molten. Along the length of the trough 29a are spray nozzles 37 that cover the segments with water to quench the segments as they travel along the trough. The fluid and the angle 44 of the trough act to accelerate the segments and separate them in the trough and continuously propel them along the trough.

The first trough 29a may join a second trough 29b. The inclination angle 46 of the trough 29b is less than angle 44 of the trough 29a. Additional fluid is introduced in the trough 29b by conduit 48 through opening 50. At the lesser angle 46 the fluid level 52 builds up to thoroughly quench the segments and carry them along toward the open end 54 of the trough 29b. The lesser angle 46 preferably results in a pitch to the trough that is the same as a common sewer line pitch of about ¼-inch (0.64 cm) per foot. The cross-section of the troughs is preferably one that has a flat bottom and angled sides diverging from the bottom. This is the same as a common log flume cross-section, which works well to self-clear if one segment (log) hangs up in the trough. As the water level rises behind a hung segment, the width of the water increases to aid clearing.

Below the end 54 is a container 56 to collect the segments 30 for further processing, such as recycling. Near the open end 54, the fluid can be drained off through drain opening 58 and drain conduit 60 or the fluid can flow out of the end 54 and into container 56 where a container opening 62 is attached to a conduit 64. The fluid collected in conduits 60 and/or 62 can be disposed of, or the fluid can be filtered and returned to the upper end 34 of the trough 29a via conduit 32 and be reused. In some cases trough 29b may not be needed when the distances to the container are short. In this case, trough 29a would terminate at the container 56.

Trough 29a is shown with an optional feature where the upper end 34 is moveable to allow it to be displaced from beneath the segmenting device when it is desired to deposit the polymer segments in a buggy or the like, or at an unscheduled start when water flow in the trough has not been established. An actuator 39, such as a fluid cylinder, has an actuator rod 41 attached to upper end 34 which is part of a moveable portion 45a of trough 29a which slides within a fixed portion 45b of trough 29a. When the cylinder rod is moved in the direction of arrow 47 the moveable portion 45a of the trough slides in the fixed portion 45b and moves from beneath the segmenting device 24. A fluid trough with such a feature can be obtained from Conair, Corp., Pittsburgh, Pa.

Transporting the polymer via fluid flow in a trough combines quenching and material handling thereby reducing equipment complexity. The polymer segments are solid enough when reaching the accumulating container so that no cleanup of molten polymer is required and the segments remain discrete and do not weld to each other. Immediate water quenching of the material reduces direct air contact with the molten polymer thereby reducing degradation and increasing the value of the recycle product.

Figures 3, 4:
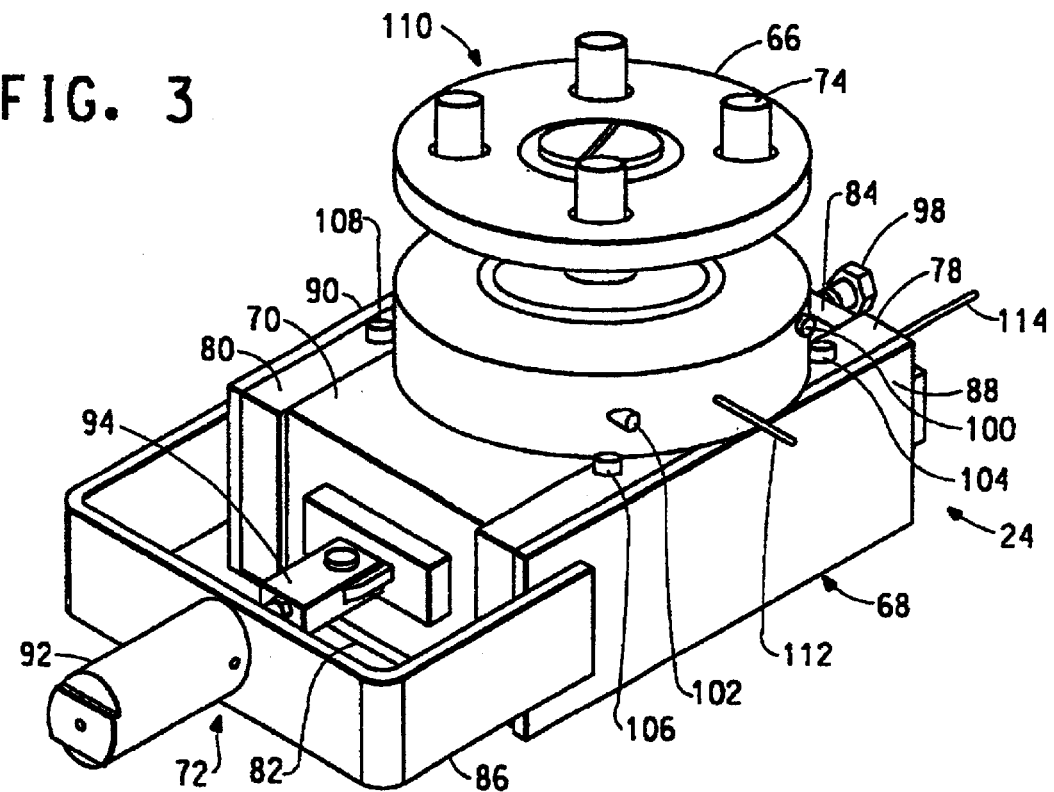
FIG. 3 is a perspective view of a polymer segmenting device.
FIG. 4 is a bottom view of the polymer segmenting device of FIG. 3.

FIGS. 3 and 4 show greater detail of the segmenting device 24. In a preferred embodiment the segmenting device 24 comprises a cross-section transition connector 66, a block housing 68, a dual channel moveable block 70 and a block oscillator 72. The connector 66 attaches to the diverter valve 12 (FIG. 1) with four attachment bolts, such as bolts 74. The block housing 68 is attached to the bottom of the connector 66 and cop rises side plates 78 and 80 attached to a cut-off plate 82, end plate 84 and actuator bracket 86. The cut-off plate 82 has a first cut-off opening 83 and a second cut-off opening 85 passing therethrough. Each opening 83, 85 has a flattened shape 87 with a width 89 less than its length 91. The cut-off openings 83, 85 represent containment exits for the segmenting device 24. The side plates 78 and 80 are covered with thermal insulation plates 88 and 90, respectively. The block oscillator 72 comprises an actuator 92, attached to the bracket 86, and link 94 that attaches the moveable end 96 of the actuator to the block 70. The end plate 84 is attached to the side plates 78 and 80 and includes an adjustable stop 98, which is adjusted to contact the block 70 at one movement position when the actuator moves the block toward the end plate.

The connector 66 is heated by heaters 100 and 102. The block housing 68 is heated by heaters 104 and 106 in side plate 78, and heaters 108, 110 (not visible) in side plate 80. Thermocouple 112 in connector 66 is used to control the heaters 100 and 102. Thermocouple 114 in side plate 78 is used to control the heaters 104 and 106. Thermocouple 116 in side plate 80 is used to control the heaters 108 and 110. The heaters keep the polymer molten in the segmenting device 24. The heaters can reheat the polymer in the segmenting device so if it is shut down and allowed to cool, it can be restarted without having to clean out the solidified polymer. For instance, if nylon is the polymer being processed, a reheat temperature of about two hundred fifty (250° C.) degrees Centigrade will melt the polymer so the segmenting device can be operated. During operation a temperature of about two hundred eighty five degrees. Centigrade (285° C.) is set for continuous running.

Figure 5A:
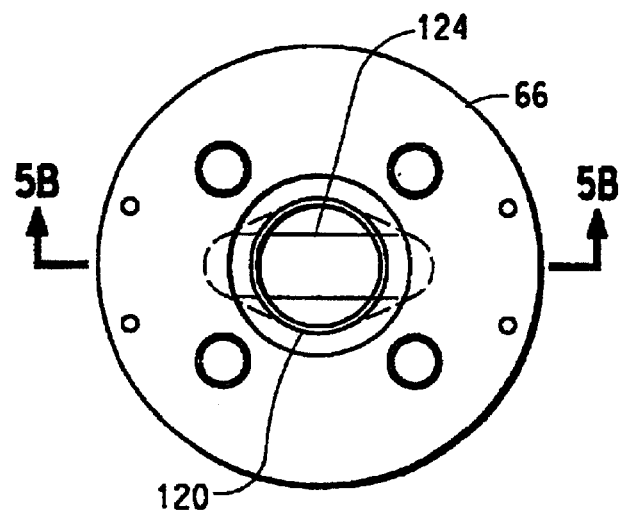
FIGS. 5A, 5B, and 5C are a top view, side section view and bottom view, respectively of a transition connector.
Figure 5B:
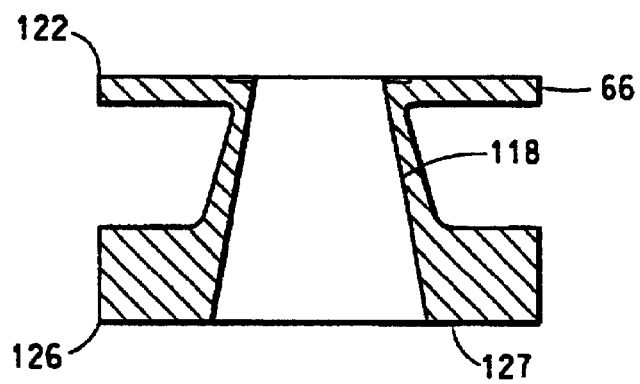
Figure 5C:
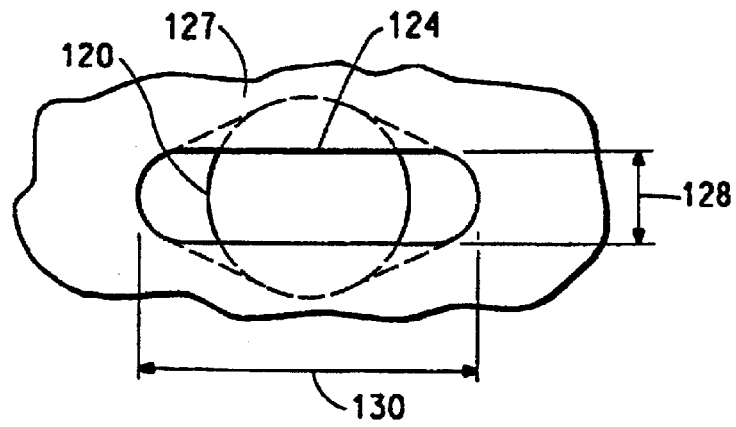

The cross-section transition connector 66 is shown in more detail in FIGS. 5A, 5B, and 5C. The connector has a first passage 118 for shaping the polymer stream and, in a preferred embodiment, providing a transition from a circular shape 120 at an entrance end 122 to a flattened shape 124 at an exit end 126. The flattened shape 124 at exit end 126 is surrounded by a flat surface 127 which is arranged to abut the moveable block 70 (FIG. 3). The flattened shape 124 has a width 128 that is less than length 130. In a preferred embodiment the width is about twenty five to thirty percent (25–30%) of the length. In other embodiments the passage 118 may be cylindrical throughout or may have a flattened shape throughout, where the connector cross-section does not change, or may have some other shape suiting a particular need.

FIGS. 6A, 6B, and 6C show important relationships between the passages in the connector 66 and moveable block 70, and the cut-off openings 83 and 85 in the cut-off plate 82. The first passage 118 in connector 66 has its exit end 126 abutting the moveable block 70 held in place by block housing 68 (FIG. 3). The moveable block 70 has a second passage 132 and a third passage 134 which each have a cross section with a flattened shape throughout their length similar to the flattened shape 124 at exit end 126. FIG. 7 shows a perspective view with hidden lines that shows the relationship of the passages when block 70 is in the first position of FIG. 6A. In FIG. 7 the block oscillator 72, bracket 86, end plate 84, and insulator plates 88 and 90 are omitted for clarity. In a first position of block 70 shown in FIG. 6A an entrance end 136 of second passage 132 is aligned with the exit end 126 of the first passage 118, thereby permitting the flow of polymer 137 therebetween. At the same first position an exit end 138 of second passage 132 is aligned with the first cut-off opening 83 in plate 82, thereby permitting the flow of polymer therebetween. At the same first position, an entrance end 140 of third passage 134 is blocked by surface 127 thereby interrupting the alignment of the third passage 134 with the first passage 118 and preventing the flow of polymer therebetween. At the same first position, an exit end 142 of third passage 134 is blocked by a surface 144 of plate 82 thereby interrupting the alignment of the third passage 134 with the second cut-off opening 85 and preventing the flow of polymer therebetween.

When it is desired to cut off a segment of polymer 137 that is flowing through passages 118 and 132 and first cut-off opening 83, the actuator 92 of block oscillator 72 (FIGS. 3 and 4) is energized to move block 70 in the direction of arrow 146 as seen in FIG. 6B. FIG. 6B shows an intermediate position of block 70 between the first position shown in FIG. 6A and the second position shown in FIG. 6C. This begins to cut off flow of polymer between passage 118 and passage 132 and between passage 132 and first cut-off opening 83. At the same time, this permits flow of polymer between passage 118 and passage 134 and between passage 134 and second cut-off opening 85. From a previous shifting of the block there is already polymer in the passage 134, which remains molten due to heaters 104, 106, 108, and 110 in block housing 68 (FIGS. 3 and 4). It is important that the continuous flow of polymer starts through contained passage 134 and containment exit 85 before the flow is stopped through contained passage 132 and containment exit 83.

After further motion in direction of arrow 146, as seen in FIG. 6C, block 70 has reached the second position. In the second position, flow of polymer between passage 118 and passage 132 has been stopped as the alignment between an entrance end 136 of passage 132 has been interrupted by surface 127 of connector 66. The flow of polymer between passage 132 and first cut-off opening 83 has also stopped as alignment between exit end 138 and opening 83 has been interrupted by surface 144. This forms a polymer segment 30. At the same time full flow of polymer is established between passage 118 and passage 134 and between passage 134 and second cut-off opening 85.

In this way continuous flow of polymer is maintained through one or both or the other of containment exit 83 and 85 to avoid stopping or "dead-heading" the polymer flow during the segmenting process that might create undesired polymer pressure increases. The use of a contained flow with at least two containment exits permits interrupting flow to one exit to form a discrete segment at that exit while continuing flow to another containment exit without "dead-heading" as might be the case with a single containment exit where the polymer flow is interrupted for segmenting. It is desirable when providing one polymer passage going to two or more passages that the flow of polymer always has a path to one, both or another of the passages so in case of a machine failure with the moveable block, there is always a path for the polymer to exit either under pressure or by gravity drain.

When it is desired to cut off polymer flow through passages 118 and 134 and second cut-off opening 85, the actuator 92 of block oscillator 72 (FIGS. 3 and 4) is energized to move block 70 in the direction opposite arrow 146 (FIGS. 6C and 6B) to reverse the process and move block 70 from the second position of FIG. 6C to the first position of FIG. 6A. Another segment 30 will be formed, this time at containment exit 85, as the polymer flow is stopped through passage 134 and second cut-off opening 85, and the polymer flow is restored to passage 132 and first cut-off opening 83.

Keeping the polymer contained in passages 132 and 134 is important to keep pressure on the polymer before cutting so the segments are forcefully moved toward the inclined surface of the trough and away from the containment exit at cut-off openings 83 and 85, versus relying solely on gravity to move the segments away from the segmenting device and toward the trough (as in the Japanese Patent JO 81 55957). It is important, however, that the passages are designed to drain under the influence of gravity so polymer does not remain in the device and can be easily removed when polymer flow is stopped during a process shutdown.

It is important that the passages 132 and 134 are close together at their entrance ends 136 and 140, respectively. The entrance ends are separated by only a narrow flat surface 148, best seen in FIG. 7, when the space 150 between passage centerlines is slightly more than one apparent passage width 152. The apparent passage width is the width measured across an angled entrance end, such as angled entrance end 140. The actual cross-section width of passages 132 and 134 would be slightly less than the apparent passage width. Preferably, the apparent passage width for passages 132 and 134 is equivalent to the passage width 128 of passage 118. The space 150 determines the distance the block 70 must shift from aligning passage 132 with passage 118 to aligning passage 134 with passage 118. This shift distance, equal to space 150, is equal to one apparent passage width 152 plus the width of flat surface 148. During high flow rates of polymer rapid oscillation of block 70 is required to form short segments of polymer. The shorter the shift distance, the more rapid the oscillation can be.

It is also important that the passages 132 and 134 are spaced apart at their exit ends 138 and 142, respectively; they are separated by a centerline to centerline distance 154 of several passage widths, as best seen in FIG. 7. This distance is important to keep the polymer segments spaced far enough apart so they do not rejoin when two segments are falling from the segmenting device as seen in FIG. 6B. It also provides some spacing to separately handle the segments in the trough. A spacing distance 154 between the exit ends of passages 132 and 134 equal to two or more passage widths is a preferred minimum, and a spacing of about four or more passage widths is more preferred. A very large spacing would require a thicker block 70 or a larger diverging angle 155 (FIG. 6A) between passages, which would be less preferred. A diverging angle of thirty to seventy degrees (30° to 70°) is preferred; at a large angle, the apparent width of the passages increases, which increases the shift distance. The first and second cut-off openings 83 and 85, respectively, are placed at a spacing of one to two width dimensions less than the second spacing 154 of the second and third passages 132 and 134, respectively, where the passages abut the cut-off plate. This serves to space the polymer stream passing from the first cut-off opening apart from the polymer stream passing from the second cut-off opening by a distance of at least two width dimensions.

Although a flattened shape is illustrated and preferred for the cross-sectional shape of passages 132 and 134, and the exit end of passage 118, a cylindrical or oval shape, suggested by dashed lines 156 in connector 66 of FIG. 6A could also be used. Keeping the passage width the same would decrease the cross-section area of the passages compared to the flattened shape, which would decrease the polymer flow rate at the same polymer driving pressure. Alternatively, this may increase the shift distance compared to the flattened shape if the cross-section area of the cylindrical or oval passages remains the same as the flattened shape and the width of the shape increases, thereby increasing the shift distance. In this case the flow rate of the polymer may need to be decreased if the shift time has increased. Also, a cylindrical or oval shaped polymer segment may have slightly less surface area than a flattened one and would require slightly longer quench times which may require longer trough lengths. Other means of compensating for different shaped passages is possible. For the best shift time, polymer flow rate, and quench time, however, a flattened cross-section is preferred. Shaping the polymer into a flattened shape and separating the polymer into discrete segments exposes more surface area per segment to speed up solidification, and results in a finished material size that is easy to accumulate and cut up for recycle.

FIG. 8 shows an alternate embodiment 24a of the polymer segmenting device 24 with the block 70 shown in the first position with passage 132 aligned with passage 118. In this embodiment the polymer cut-off is accomplished at the exit end 126 of connector 66 at surface 127. The first opening 83a and second opening 85a in plate 82 no longer function to cut off polymer and are enlarged to avoid contact with the polymer at both the first and second positions of block 70. After cut-off, and beginning of full flow of polymer 137 through passage 132 as shown, the polymer in block 70 has completely flowed out of passage 134. An air bleed passage, such as passage 158, permits air to flow into passage 134 as the polymer is flowing out to permit free flow of polymer out of passage 134 and avoid suction forces on the polymer. If desired a heated pressurized gas may be applied to the bleed passage to speed up the clearing of polymer from passage 134. Alternatively, the polymer flow rate through passage 118 can be decreased to allow time to clear passage 134. In this embodiment the exit ends 138 and 142 of passages 132 and 134, respectively, represent the containment exits for segmenting device 24a.

In referring to FIGS. 3 and 4, the block housing 68 is assembled so the cut-off plate 82 is rigidly attached to the side plates 78 and 80. The block housing is then attached to the connector 66 to contain the moveable block 70 between the cut-off plate 82 and connector 66. This containment is tight enough to prevent excessive polymer leakage along surfaces 127 and 144 (FIG. 6A). An alternate arrangement is shown in FIGS. 7 and 9 where the cut-off plate 82 is resiliently attached to side plates 79 and 80 using spring elements 160, 162, 164, and 166 (not seen in far corner of FIG. 7). The spring elements may be spring washers that are compressed by the heads of bolts 168, 170, 172 and 174 (not seen in far corner), respectively. Clearance 176 is provided between cut-off plate 82 and side plate 78, and clearance 178 is provided between cut-off plate 82 and side plate 80. This clearance arrangement allows the spring elements to force the surface 144 of cut-off plate 82 against the block 70 thereby forcing block 70 against surface 127 of connector 66. This results in very low leakage of polymer along surfaces 127 and 144 that are tightly urged against block 70. Cut-off plate 82 is also provided with shoulders 180 and 182 that bear against mating shoulders 184 and 186, respectively, on block 70 to align block 70 between side plates 78 and 80 without contacting side plates 78 and 80. This improves the ease of assembly and reduces the friction compared to a controlled tight fit of block 70 between the side plates 78 and 80.

Figure 10A:
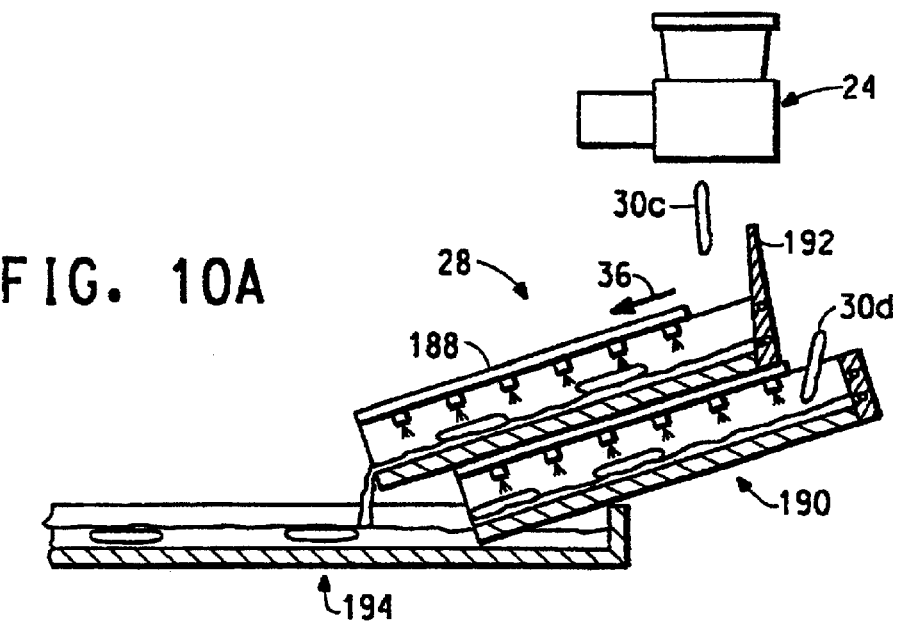
FIG. 10A is a side section view of an alternate embodiment of FIG. 2A.
Figure 10B:
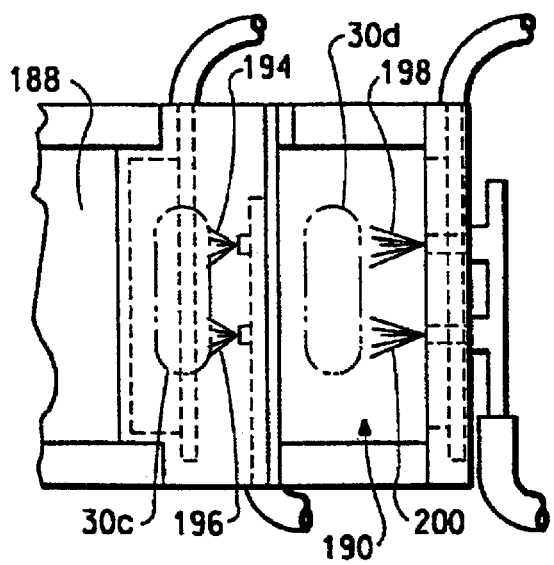
FIG. 10B is a plan view of the upper end of the embodiment of FIG. 10A.

FIGS. 10A and 10B illustrate another arrangement of troughs to catch and transport the segments away from the segmenting device 24. In this embodiment the segments 30c and 30d are oriented one behind the other relative to the direction of travel 36 along the trough. To avoid all possibility of contact of segment 30c with segment 30d, each segment is dropped into a separate inclined trough, such as trough 188 for segment 30a and trough 190 for segment 30b. Each of the troughs 188 and 190 are similar to trough 29a in FIGS. 2A and 2B and may include the moveable portion 45a as in FIG. 2A, but would exclude the separating panel 23. In trough 188, an end wall 192 is extended above the trough to form a wall that is tapered to be thicker at the bottom than the top, to thereby contain the slot and stream openings and associated fluid connections at the bottom. The wall also serves to separate the polymer segments soon after they leave segmenting device 24. Trough 188 has two or more forceful streams, such as streams 194 and 196, that act against the broad side of the segment 30c as it hits the trough. Trough 190 also has two or more forceful streams, such as streams 198 and 200, that act against the broad side of the segment 30d as it hits the trough. Troughs 188 and 190 both empty into trough 202, which is essentially the same as trough 29b in FIG. 2A. The embodiment of FIGS. 10A and 10B may be preferred over the embodiment of FIGS. 2A and 2B for exceptionally high throughputs where the possibility of molten segments contacting each other is great. The multiple forceful streams that hit the broad side of the segments may provide better acceleration of the segments along the troughs so contact between two successive segments in a trough is avoided.

Figure 10C:
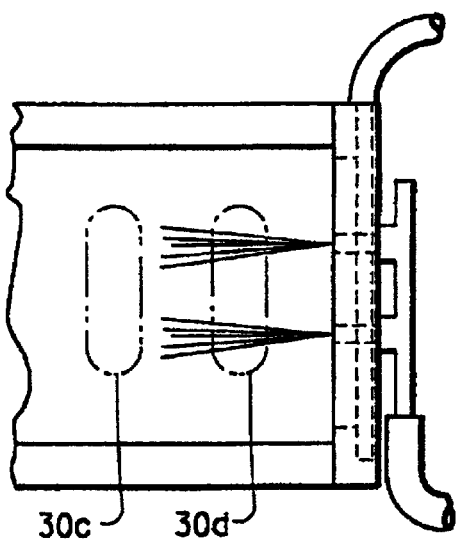
FIG. 10C is a plan view of the upper end of an alternate embodiment of FIG. 2A.

FIG. 10C illustrates another arrangement where segments 30c and 30d are oriented one behind the other relative to the direction of travel 36 along the trough. It is proposed that both segments are dropped in the same trough which could be identical to the troughs 29a and 29b in FIGS. 2A and 2B with the exception that the separating panel 23 is omitted. In this case the polymer throughput would have to be low enough that segment 30d would be accelerated out of the way before segment 30c landed in the trough. For certain applications, this would provide a simpler system than that of FIGS. 2A and 10A.

Figure 11A:
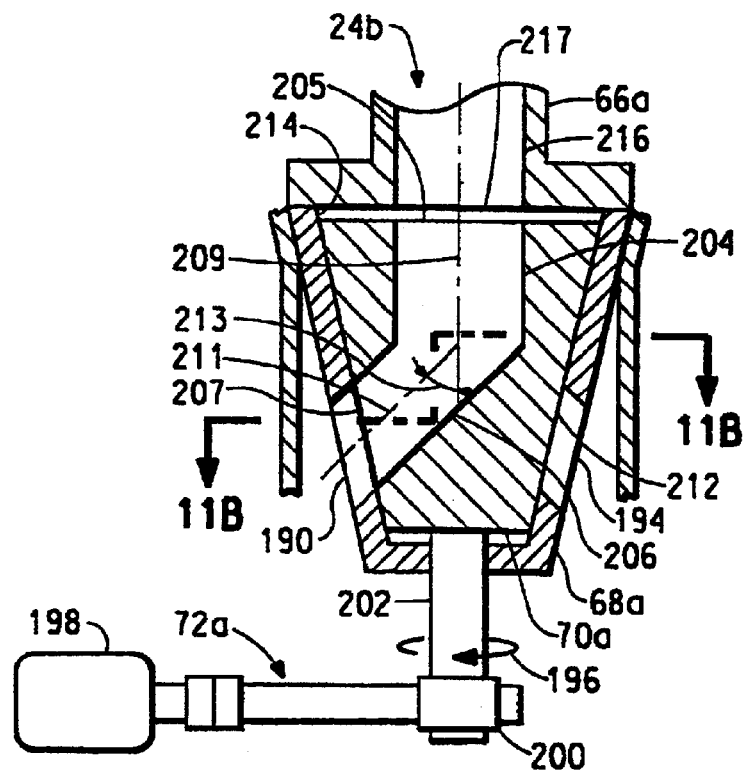
FIGS. 11A and 11B are section views illustrating another embodiment of a segmenting device.
Figure 11B:
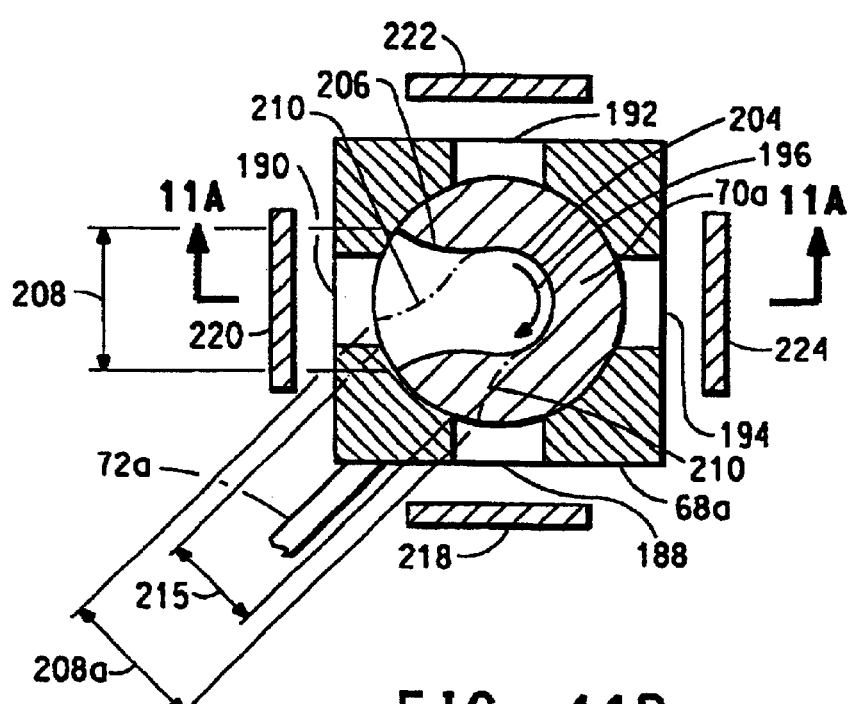

FIGS. 11A and 11B illustrate another embodiment of a segmenting device 24b which has four containment exits. Segmenting device 24b comprises a connector 66a, a block housing 68a, a moveable block 70a and a block rotater 72a. In this embodiment, the walls of the housing 68a have four containment exits 188, 190, 192, and 194 which act as cut-off openings (similar to the action of the cut-off openings 83, 85 in the plate 82, e.g., FIGS. 6A–6C). The moveable block 70a is rotated continuously in direction 196 by rotater 72a that comprises a motor 198 acting through a right angle gear box 200 to rotate block shaft 202. The speed of the motor can be varied to provide means of controlling the segment size. Connector 66a has a first passage 216 with an exit end 217. Block 70a has a vertical passage 204 having an inlet end 205 aligned with exit end 217. Passage 204 intersects a downwardly inclined horizontal passage 206 having an outlet end 207 which is arranged to momentarily align with each of the containment exits 188–194 as it rotates in the direction 196. Vertical passage 204 has an axis 209 that passes through the center of the inlet end 205 of passage 204. Horizontal passage 206 has an axis 211 that passes through the center of the outlet end 207 of passage 206. Axis 211 is angled away from axis 209 by an angle 213 of 45 degrees or less to direct the polymer laterally toward the containment exits, but still in the downward direction of vertical passage 206.

Horizontal passage 206 at outlet end 207 has width 208 that is wide enough to span two adjacent containment exits during a portion of the rotation of the block 70a. For instance, in FIG. 11B, the dotted and dashed lines 210 represents the horizontal passage 206 at a position intermediate containment exit 188 and 190. In this position, width 208a spans width 215 between exit 188 and 190 so the polymer flowing through passage 206 is passing through exit 190 before it is blocked from passing through exit 188 as lock 70a rotates in direction 196. In this way polymer is always passing through one, both, or another of containment exits 188–194 so the continuous flow of polymer is never "dead-headed". Block 70a is shown with a conical shape 212 that mates in a conical recess 214 in housing 68a. This ensures a tight fit that controls polymer leakage and avoids excessive friction that may otherwise bind up the rotation of block 70a in housing 68a. The passage 216 in connector 66a and passages 204, 206 and containment exits 188–194 are all illustrated as generally cylindrical in shape, but other shapes could also be used.

A Housing 68a is provided with safety deflectors 218, 220, 222, and 224 positioned adjacent containment exits 188, 190, 192, and 194 respectively. The deflectors 218–224 are spaced from the containment exits 188–194 to permit free flow of polymer from the exits in the direction of the axis 211 of the passage 206, but are provided to direct the polymer downward in the direction of the axis 209 of the passage 204 after it exits the housing 68a and toward a transporting device 28 as in FIG. 1. The safety deflectors may not be needed for all but very high polymer flow rates. Although the segmenting device 24b is illustrated where the block 70a rotates continuously in direction 196 to segment the polymer, it is contemplated that block 70a could oscillate back and forth (i.e., rotatably reciprocate) between any two adjacent containment exits, such as exit 188 and 190, and polymer segmentation would occur. In this case the other containment exits 192 and 194 would not be necessary and could be omitted from housing 68a. It is also contemplated that the number of containment exits could be varied to include only three exits or more than the four exits shown. At least two exits would be required to avoid "deadheading" the polymer stream during segmenting. The passages in device 24b are arranged to permit gravity draining of polymer from the device during process shutdown.

Figure 12A:
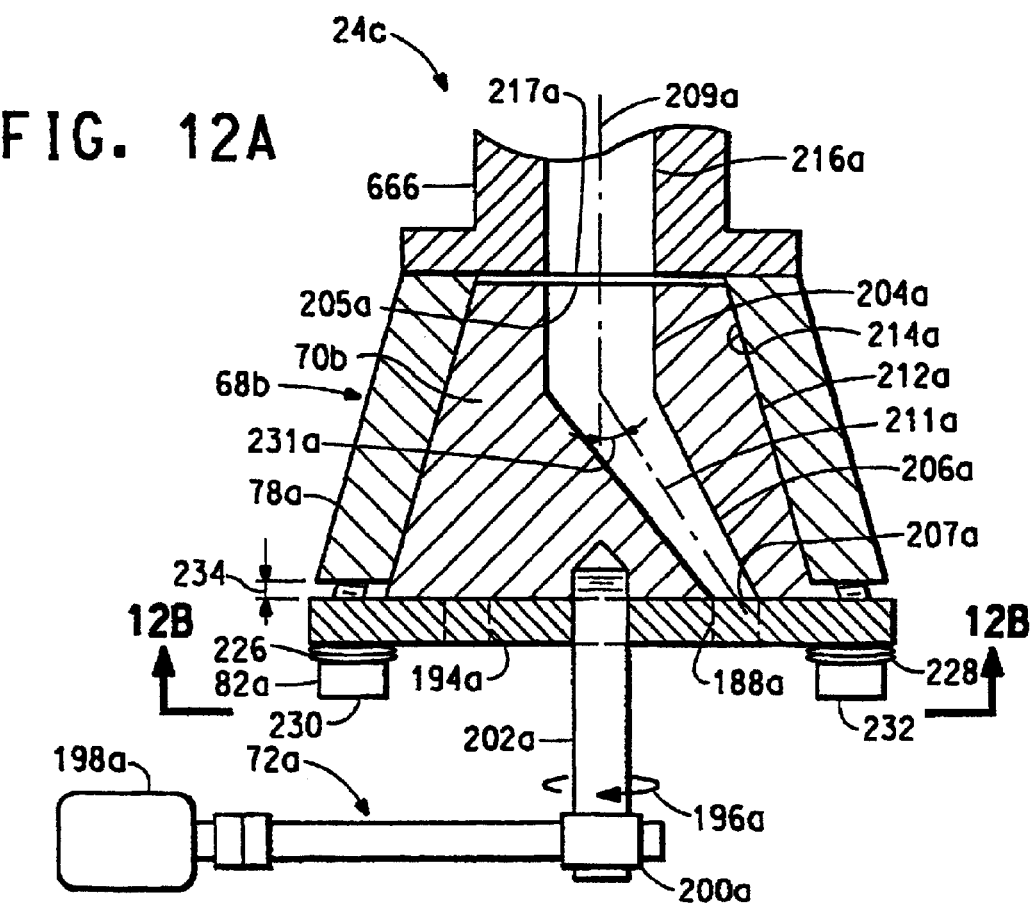
FIGS. 12A and 12B are a cross-section view and a bottom view, respectively, illustrating another embodiment of a segmenting device.
Figure 12B:
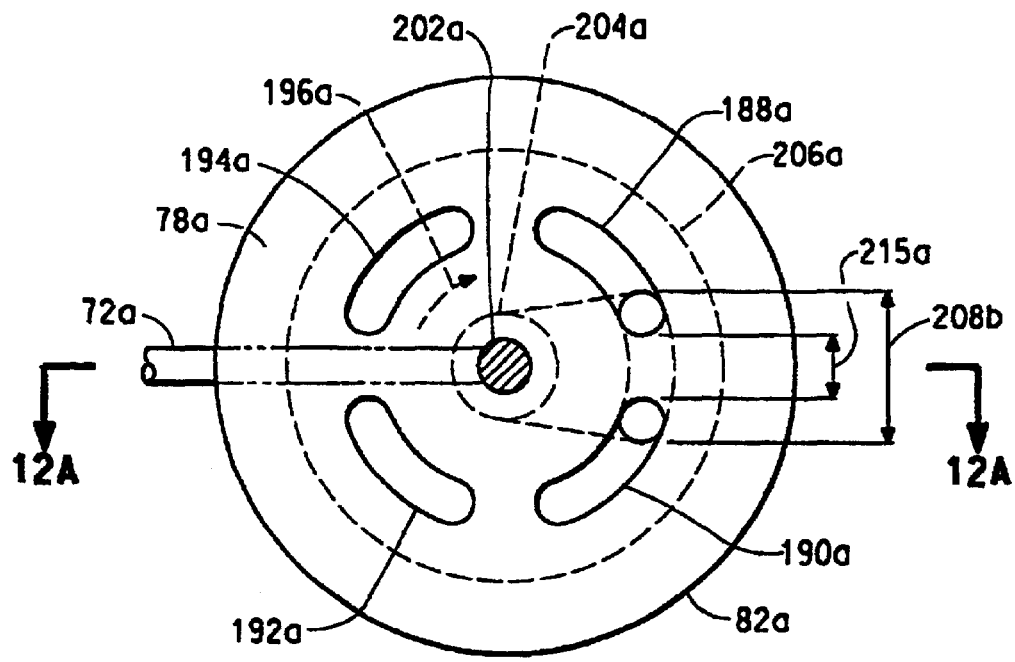

FIGS. 12A and 12B illustrate another embodiment of a segmenting device which has four containment exits. Segmenting device 24c comprises a connector 66b, a block housing 68b comprising continuous vertical side plate 78a and cut-off plate 82a, a moveable block 70b and a block mover 72b. In this embodiment, the cut-off plate 82a of housing 68b has four containment exits 188a, 190a, 192a, and 194a which also act as cut-off openings. The moveable block 70b is rotated continuously in direction 196a by mover 72a that comprises a motor 198a acting through a right angle gear box 200a to rotate block shaft 202a. The speed of the motor can be varied to provide means of controlling the segment size. Connector 66b has a first passage 216a with an exit end 217a. Block 70b has a vertical passage 204a that intersects a downwardly inclined horizontal passage 206a which is arranged to momentarily align with each of the containment exits 188a–194a as it rotates in the direction 196a. Vertical passage 204a has an axis 209a that passes through the center of the inlet end 205a of passage 204a. Horizontal passage 206a has an axis 211a that passes through the center of the outlet end 207a of passage 206a. Axis 211a is angled away from axis 209a by an angle 213a of 45 degrees or less to direct the polymer laterally toward the containment exits, but still in the downward direction of vertical passage 206a.

Horizontal passage 206a at outlet end 207a has a width 208b that is wide enough to span between two adjacent containment exits during rotation. For instance, in FIG. 11B, the horizontal passage 206a is shown at a position intermediate containment exit 188a and 190a. In this position, width 208b spans width 215a between exit 188a and 190a so the polymer flowing through passage 206a is passing through exit 190a before it is blocked from passing through exit 188a as block 70b rotates in direction 196a. In this way, polymer is always passing through one, both, or another of containment exits 188a–194a so the continuous flow of polymer is never "dead-headed". Block 70b is shown with a conical shape 212a that mates in a conical recess 214a in housing 68b. Block 70b is pressed into conical recess 214a by spring washers arranged around the cut-off plate 82a, such as washers 226 and 228 held in place by bolt heads 230 and 232, respectively. The cut-off plate 82a is urged by spring washers 226 and 228 toward the end of side plate 78a within the limits of space 234. This ensures a tight fit that controls polymer leakage and avoids excessive friction that may otherwise bind up the rotation of block 70b in housing 68b. The passage 216a in connector 66b and passage 204a are generally cylindrical in shape, and passage 206a and containment exits 188a–194a are flattened cylindrical shapes that are bent, but other shapes would work as well.

Although the segmenting device 24c is illustrated where the block 70b rotates continuously in direction 196a to segment the polymer, it is contemplated that block 70b could oscillate back and forth between any two adjacent containment exits, such as exit 188a and 190a, and polymer segmentation would occur. In this case the other containment exits 192a and 194a would not be necessary and could be omitted from housing 68b. It is also contemplated that the number of containment exits could be varied to include only three exits or more than the four exits shown. At least two exits would be required to avoid "dead-heading" the polymer stream during segmenting. The passages in device 24c are arranged to permit gravity draining of polymer from the device during process shutdown.

It should be understood that other features (e.g., heaters, insulators, thermocouples, seals, fasteners) common in the mechanical art or shown in the embodiments of FIGS. 3 and 4 have been omitted from FIGS. 11A, 11B, 12A and 12B for clarity of illustration.

Test Results

Several tests were run using the device illustrated in FIGS. 3 and 4 processing nylon polymer. The flattened shape was about one inch (1") (2.54 cm) thick and 3.5" (8.9 cm) wide. Different polymer flow rates were tested and the segment sizes and oscillation times recorded. Polymer rates of from about twenty four hundred pounds per hour (2400 lbs./hr) (1090 Kg/hr) to twenty two thousand three hundred pounds per hour (22,300 lbs./hr) (10,100 Kg/hr) (estimated) were successfully run. Oscillation times were varied between 0.3 to 0.5 seconds by using a timer controlling a valve connected to an air cylinder actuator for the oscillator. Segment sizes varied from 0.34 lbs. (0.15 kg) to about 1.86 lbs. (0.84 kg). At low rates, segments were well defined, and at high rates segments sometimes balled up or were drawn out with stringy tails. At higher rates, some segments stuck together in the receiver, but were easily separated by hand after cooling.

What is claimed is:

1. A method of continuously segmenting a polymer stream, comprising the steps of:
   (a) shaping and containing the polymer stream in a first passage;
   (b) passing the shaped polymer stream from the first passage through a second passage containing the polymer in a moveable block placed in a first position;
   (c) passing the polymer stream through a first cut-off opening in a fixed plate abutted against the moveable block and aligned with the second passage in the block;
   (d) shifting the moveable block in a first direction to interrupt the alignment of the second passage with the first cut-off opening and thereby cut the polymer stream and form a discrete segment of polymer, and simultaneously placing the moveable block in a second position for passing the shaped polymer stream from the first passage through a third passage containing the polymer in the moveable block placed in the second position, and simultaneously passing the polymer stream through a second cut-off opening in the fixed plate abutted against the moveable block and aligned with the third passage in the block, the cut-off openings each defining a containment exit;
   (e) transporting the polymer segment away from the containment exits;
   (f) shifting the moveable block in a second direction to interrupt the alignment of the third passage with the second cut-off opening and thereby cut the polymer stream and form a discrete segment of polymer, and simultaneously placing the moveable block in the first position for passing the shaped polymer stream from the first passage through the second passage in the moveable block placed in the first position, and simultaneously passing the polymer stream through the first cut-off opening in the fixed plate abutted against the moveable block and aligned with the second passage in the block.

2. The method of claim 1, wherein the step of shaping the polymer stream comprises shaping the stream into a flattened shape, the shape having a width that is less than a length;

The method further comprising the steps:
   (g) arranging the flattened shape length dimensions in the second and third passages in the moveable block parallel to each other, and arranging the flattened shape length dimensions in the first and second cut-off openings in the fixed plate parallel to each other, and
   (h) spacing the second and third passages at a first spacing of one to two width dimensions from each other adjacent the first passage and spacing the second and third passages at a second spacing of three or more width dimensions from each other adjacent the first and second cut-off openings, and
   (i) spacing the first and second cut-off openings at a spacing of one to two width dimensions less than the second spacing of the second and third passages, thereby spacing the polymer stream passing from the first cut-off opening apart from the polymer stream passing from the second cut-off opening by a distance of at least two width dimensions.

3. A method of segmenting and quenching a continuous molten polymer stream, comprising the steps of:
   (a) directing the polymer stream to a first containment exit and passing the polymer stream into an open space above an inclined surface;
   (b) interrupting the polymer stream coming from the first containment exit to form a discrete polymer segment;
   (c) redirecting the polymer stream to a second containment exit and passing the polymer stream into the open space above the inclined surface;

(d) interrupting the polymer stream coming from the second containment exit to form a discrete polymer segment;

(e) directing a quench fluid down the inclined surface and contacting the polymer segment with the fluid thereby urging the polymer segment down the inclined surface and cooling the molten polymer.

4. The method of claim 3, wherein the interrupting step comprises interrupting the polymer stream before the polymer stream contacts the inclined surface.

5. The method of claim 3, wherein urging the polymer segment down the inclined surface comprises urging a first segment at a rate so that a second segment immediately following the first segment contacts only the inclined surface and the quench fluid, and is free of contact with the first segment.

6. An apparatus for continuously segmenting a polymer stream, comprising:

a shaping connector having a first passage for passing a polymer stream and shaping it, the first passage ending in an exit end;

a moveable block urged against the exit end of the first passage in the connector, the block having a second passage aligned at a first position of the block for receiving the shaped polymer stream from the first passage, the block having a second passage spaced from the third passage and aligned for receiving the shaped polymer stream from the first passage at a second position of the block;

a fixed cut-off plate abutted against the moveable block and having a first cut-off opening spaced apart from a second cut-off opening, the first cut-off opening aligned to receive polymer from the second passage, the space between the first and second cut-off openings being less than the space between the second and third passages where the passages abut the cut-off plate;

an oscillator for shifting the moveable block from the first position to the second position to interrupt the alignment of the second passage with the first passage and the first cut-off opening, and to align the third passage with the first passage and the second cut-off opening, and for shifting the block back to the first position.

7. The apparatus of claim 6, wherein the shaping connector shapes the polymer stream into a flattened shape having a width that is less than a length;

the apparatus further comprising:

the second and third passages in the moveable block have a similar flattened shape with the length dimensions of the shapes arranged parallel to each other, and the first and second cut-off openings in the fixed plate have a similar flattened shape with the length dimensions of the shapes arranged parallel to each other, and the second and third passages are placed at a first spacing of one to two width dimensions from each other adjacent the first passage and the second and third passages diverge to a second spacing adjacent the first and second cut-off openings.

8. An apparatus for segmenting and quenching a continuous molten polymer stream, comprising:

a segmenting device connected to a source of molten polymer with polymer stream containment means and stream interrupting means to form a discrete polymer segment length, the device having a containment exit;

an inclined surface having an upper end spaced below the containment exit by a distance at least equal to a segment length, the surface arranged to receive a segment from the containment exit, the inclined surface having a lower end spaced laterally from the containment exit;

a fluid jet at the upper end of the inclined surface and arranged to direct quench fluid down the inclined surface into contact with the polymer segment for urging the polymer segment down the inclined surface and cooling the molten polymer.

9. The apparatus of claim 8, wherein the segmenting device comprises a connector with a first polymer passage exit, a moveable block adjacent the first polymer passage exit, the block containing second and third polymer passages each with exit ends; a cut-off plate adjacent the exit ends of the two polymer passages in the block, the plate containing two cut-off openings with each comprising a containment exit; and an oscillator attached to the block for shifting the block from a first position, aligning the second passage with the first passage and first cut-off opening, to a second position, aligning the third passage with the first passage and second cut-off opening, and for shifting the block back to the first position.

10. An apparatus for continuously segmenting a polymer stream, comprising:

a shaping connector having a first passage for passing a polymer stream and shaping it, the first passage ending in an exit end having a width;

a moveable block urged against the exit end of the first passage in the connector, the block having a second passage with a width aligned at a first position of the block for receiving the shaped polymer stream from the first passage and passing it to an exit end of the second passage, the block having a third passage spaced from the second passage and with a width aligned for receiving the shaped polymer stream from the first passage and passing it to an exit end of the third passage at a second position of the block;

the second and third passages are placed at a first spacing of one to two width dimensions from each other adjacent the first passage and the second and third passages diverge to a second spacing of two or more width dimensions at the exit ends of the second and third passages;

an oscillator for shifting the moveable block from the first position to the second position in the direction of the passage widths to interrupt the alignment of the second passage with the first passage, and to align the third passage with the first passage, and for shifting the block back to the first position.

11. An apparatus for continuously segmenting a polymer stream, comprising:

a connector having a first passage for passing and containing a polymer stream, the first passage having an exit end;

a moveable block positioned adjacent the exit end of the first passage, the block having a second passage for containing said polymer stream, the second passage having an inlet end and an exit end, the inlet end of the second passage aligned with the exit end of the first passage;

a housing containing the moveable block and supporting it for rotation therein, the housing having at least two containment exits, the containment exits arranged to be alignable with the exit end of the second passage during rotation of the moveable block in the housing;

rotating means engaged with the moveable block to rotate the moveable block within the housing.

12. The apparatus of claim 11, wherein the rotating means is for continuous rotation of the moveable block within the housing.

13. The apparatus of claim 11, wherein the rotating means is for oscillating rotation of the moveable block within the housing.

14. The apparatus of claim 11, wherein the exit end of the second passage has a width in the direction of rotation of the moveable block and the containment exits are spaced apart at a distance in the direction of rotation of the moveable block, and the width is wider than the distance between two adjacent containment exits so polymer flow at one rotational position can pass through the two adjacent containment exits simultaneously.

15. An apparatus for continuously segmenting a polymer stream, comprising:

a connector having a first passage for passing and containing a polymer stream, the first passage having an exit end;

a moveable block positioned adjacent the exit end of the first passage, the block having a second passage for containing said polymer stream, the second passage having an inlet end and an exit end, the inlet end of the second passage aligned with the exit end of the first passage, the passage having a first axis passing through the center of the inlet end and a second axis passing through the center of the exit end, the second axis angled at 45 degrees or less from the first axis;

a housing containing the moveable block and supporting it for rotation therein, the housing having at least two containment exits, the containment exits arranged to be alignable with the exit end of the second passage during rotation of the moveable block in the housing, the housing having deflectors adjacent each containment exit to deflect polymer from a direction aligned with the second axis of the moveable block to a direction aligned with the first axis of the moveable block;

rotating means engaged with the moveable block to rotate the moveable block within the housing.

* * * * *